UNITED STATES PATENT OFFICE.

HENRI LE GRAND, OF HAVRE, FRANCE.

IMPROVEMENT IN COMPOSITIONS FOR CALKING SHIPS, &c.

Specification forming part of Letters Patent No. 132,365, dated October 22, 1872.

*To all whom it may concern:*

Be it known that I, HENRI LE GRAND, of the city of Havre, department of the Seine Inférieure, in the Republic of France, have invented a certain compound called "Bitumide," to be used in calking ships and for analogous purposes, of which the following is a specification:

The nature of my invention consists in mixing galipot or white resin with tar-oil and shellac.

To prepare the "bitumide," take equal parts of each of the above-named ingredients and mix warm. The proportions may vary with the quality of the ingredients.

This composition is applied to the calking of ships, in combination with oakum, and for other analogous purposes it will be applied as experience may direct.

I claim as my invention—

A compound, composed of galipot, tar-oil, and shellac, substantially in the proportions and for the purposes set forth.

HENRI LE GRAND.

Witnesses:
L. ROBIN LOUIS,
JEAN BAPTISTE GIRARD,
    83 *Cis rue de Lafayette.*